(12) United States Patent
Chandrashekar et al.

(10) Patent No.: US 11,665,389 B2
(45) Date of Patent: May 30, 2023

(54) SYSTEMS AND METHODS FOR HIGHLIGHTING CONTENT WITHIN MEDIA ASSETS

(71) Applicant: Rovi Guides, Inc., San Jose, CA (US)

(72) Inventors: Padmassri Chandrashekar, Karnataka (IN); Daina Emmanuel, Bangalore (IN); Reda Harb, Bellevue, WA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/364,082

(22) Filed: Jun. 30, 2021

(65) Prior Publication Data
US 2023/0007336 A1 Jan. 5, 2023

(51) Int. Cl.
| | |
|---|---|
| *H04N 21/45* | (2011.01) |
| *H04N 5/45* | (2011.01) |
| *H04N 21/858* | (2011.01) |
| *H04N 21/845* | (2011.01) |
| *H04N 21/431* | (2011.01) |
| *H04N 21/488* | (2011.01) |
| *H04N 21/478* | (2011.01) |

(52) U.S. Cl.
CPC ........... *H04N 21/4316* (2013.01); *H04N 5/45* (2013.01); *H04N 21/4532* (2013.01); *H04N 21/47815* (2013.01); *H04N 21/4888* (2013.01); *H04N 21/845* (2013.01); *H04N 21/858* (2013.01)

(58) Field of Classification Search
CPC ........... H04N 21/4316; H04N 21/4532; H04N 21/47815; H04N 21/4888; H04N 21/845; H04N 21/858; H04N 5/45
USPC ........................................................ 725/32
See application file for complete search history.

(56) References Cited

U.S. PATENT DOCUMENTS

| | | | | |
|---|---|---|---|---|
| 8,799,401 | B1 * | 8/2014 | Bryar | G06F 16/5846 709/224 |
| 10,580,215 | B2 * | 3/2020 | Waye | G06F 16/48 |
| 10,937,065 | B1 * | 3/2021 | Gauny | H04N 21/8405 |
| 2003/0217061 | A1 * | 11/2003 | Agassi | G06F 16/9535 |
| 2010/0066904 | A1 * | 3/2010 | Schindler | H04N 21/43074 348/E7.001 |
| 2010/0269138 | A1 * | 10/2010 | Krikorian | H04N 21/43074 725/39 |
| 2013/0198642 | A1 * | 8/2013 | Carney | H04N 21/4722 715/738 |
| 2014/0223475 | A1 * | 8/2014 | Mcintire | G11B 27/34 725/34 |

(Continued)

*Primary Examiner* — Nathan J Flynn
*Assistant Examiner* — Caroline Somera
(74) *Attorney, Agent, or Firm* — Haley Guiliano LLP

(57) ABSTRACT

Systems and methods are described herein for highlighting objects with a primary content that are likely to be of interest to a user viewing the primary content. More particularly, when the system receives a segment of primary content to be displayed on a user equipment device for consumption, the system analyzes the received segment to identify an object within the received segment. The system then checks a database storing supplemental content to determine whether supplemental content associated with the identified object is available. When supplemental content associated with the identified object is available within the database, the system modifies the received segment of the primary content to highlight the identified object and displays the modified segment of the primary content on the user equipment device for consumption.

18 Claims, 9 Drawing Sheets

(56) References Cited

U.S. PATENT DOCUMENTS

| | | | |
|---|---|---|---|
| 2015/0113563 A1* | 4/2015 | Woods | H04N 21/478 |
| | | | 725/34 |
| 2016/0112762 A1* | 4/2016 | Mallinson | G06F 16/783 |
| | | | 725/18 |
| 2017/0295414 A1* | 10/2017 | Murray | H04N 21/4725 |
| 2017/0347143 A1* | 11/2017 | Limp | H04N 21/4828 |
| 2018/0184049 A1* | 6/2018 | Moss | G06F 3/0486 |
| 2019/0278821 A1* | 9/2019 | Doyd | G06F 16/9535 |

* cited by examiner

SYSTEMS AND METHODS FOR HIGHLIGHTING CONTENT WITHIN MEDIA ASSETS

BACKGROUND

This disclosure is directed to highlighting objects with a primary content that are likely to be of interest to a user viewing the primary content. More specifically, techniques are disclosed for modifying display of segments of a primary content to highlight objects within the primary content to indicate availability of supplemental content (e.g., advertising content, purchasing information, etc.) related to the highlighted object.

SUMMARY

Businesses often advertise goods and services to consumers using advertisements presented to consumers via scheduled advertisement-breaks while consumers are watching media assets such as a movie or a serialized program. In-video stream advertising such as the presentation of short video advertisements before displaying the primary content (e.g., a movie), during, and after the end of the primary content have been used by many streaming platforms. However, such advertisements may not be of interest to the consumers and therefore lessen their effectiveness. In one approach, modern media distribution systems often present personalized advertisement content identified based on a profile of the consumers (e.g., based on age, geographic location, etc.) viewing these advertisements to in order to engage the consumers and increase the effectiveness of the advertising content. However, consumers viewing media assets such as a movie or a serialized program often use scheduled advertisement-breaks as opportunity to step away from the programming (e.g., to get snacks or to run other errands). Therefore, advertisement content which may be of interest to the consumers go unwatched, therefore reducing their effectiveness. Additionally, there may be products featured within the primary program being watched by the consumers that they may be interested in. For example, a character wearing a particular article of clothing (e.g., a jacket or a pair of shoes) or driving a vehicle may pique the interest of the consumers. However, the consumers have to manually search for advertisement content that match the products featured within the primary program, which wastes time, computing resources, and bandwidth due to a lack of available information available for the primary programs. For example, requests for needless advertising content as the consumers are searching for other products unnecessarily consume limited available bandwidth.

To overcome these problems, systems and methods are provided herein for highlighting objects with a primary content that are likely to be of interest to a user viewing the primary content. More particularly, when the system receives a segment of primary content to be displayed on a user equipment device for consumption, the system analyzes the received segment to identify an object within the received segment. For example, the system may employ an object recognition algorithm to identify one or more objects (e.g., an article of clothing, etc.) present within the received segment. The system then checks a database storing supplemental content (e.g., advertising content) to determine whether supplemental content associated with the identified object is available. When supplemental content associated with the identified object is available within the database, the system modifies the display of the received segment of the primary content to highlight the identified object. In some aspects, the system may add a highlight in an overlay around a border of the identified object. In another aspect, the identified object can be highlighted by visually distinguishing the identified object from other objects within the received segment (e.g., by adding an icon adjacent to the identified object, by providing a shaded overlay over the identified object, etc.). Finally, the system displays the segment of the primary content with the highlighted object on the user equipment device for consumption. Accordingly, methods and systems disclosed herein allow businesses to present supplemental content (e.g., advertising content) to users while they are engaged with the primary content. Moreover, users viewing the primary content can easily view supplemental content associated with objects within the segment of the primary content that the users may be interested in.

In some aspects, the system can identify a plurality of objects within the received segment of the primary content. In such an aspect, highlighting every identified object within the received segment of the primary content would overwhelm the user viewing the primary content and distract from enjoying the primary content. Accordingly, the system may prioritize one or two of the identified objects to be highlighted based on user preferences. For example, the system may retrieve a web browsing history associated with the user consuming the primary content to identify products that the user may wish to purchase. Upon determining a match between an identified object from the received segment of the primary content and a product identified from the retrieved web browsing history associated with the user, the system prioritizes the matching identified object. The system then modifies the received segment of the primary content to highlight the highest priority objects and displays the modified segment on the user equipment device.

In some embodiments, modifying the received segment of the primary content includes providing a user selectable link. For example, the user can use an input device such as a remote-control device to select a highlighted object within the displayed segment of the primary content. In another embodiment, the user can provide a voice command using, for example, a microphone, to select a highlighted object within the displayed segment of the primary content. The system, in response to detecting that the user has selected one of the highlight objects within the displayed segment of the primary content (for instance, by receiving data indicative of a selection of the user selectable link), displays the supplemental content associated with the identified object selected by the user.

In some embodiments, the system, in response to detecting that the user has selected one of the highlight objects within the displayed segment of the primary content, prevents an audio component associated with the primary content from being output. For example, the system may mute the audio of the primary content while simultaneously displaying the supplemental content along with closed-captioning data associated with the primary content. This ensures that the user can view the supplemental content including the audio component of the supplemental content while simultaneously following the primary content. In another embodiment, the supplemental content is displayed during a segment of the primary content where there is no dialogue between characters. For example, the system may delay the presentation of supplemental content until a segment of the primary content that does not include an audio component is displayed. This allows the user to engage with the supplemental content without missing the primary content.

In some aspects, the supplemental content is displayed on the user equipment device simultaneously with the primary content. For example, the primary content is displayed on a primary window of the user equipment device with the supplemental content being displayed on a secondary window as an overlay over the primary window. In another such aspect, the playback of the primary content is paused while the supplemental content is displayed on the primary window.

In an embodiments, the system, in response to detecting that the user has selected one of the highlighted objects within the displayed segment of the primary content, displays a user selectable option for interacting with the supplemental content. In one aspect, the user selectable option is an option to interrupt playback of the primary content to display the supplemental content. For instance, playback of the primary content is paused while the supplemental content is displayed on the primary window of the user equipment device. In another aspect, the user selectable option is an option to simultaneously display the primary content and the supplemental content, wherein the supplemental content is displayed in a picture-in-picture mode. In still another aspect, the user selectable option is an option to display the supplemental content for display on a second user equipment device. For example, the system may transmit the supplemental content to a mobile device of the user so that the user can view the supplemental content without interrupting the playback of the primary content.

In another aspect, the user selectable option in an option to view a purchase offer related to the identified object. For example, the system may present a Uniform Resource Locator (URL) to direct the user to a web resource where the user can purchase the identified object. In another embodiment, the system can display product reviews of the highlighted object selected by the user. In an embodiment, the system displays one or more of the user selectable options to be displayed on the user equipment device in response to detecting that the user has selected one of the highlighted objects within the displayed segment of the primary content.

In accordance with some aspects of the subject matter disclosed herein, the primary content may have scheduled interruptions where advertising content is conventionally displayed. In one aspect of the present disclosure, the system determines which of the presented user selectable options was selected by the user. The system then adjusts a frequency of the scheduled interruptions based on the determined selection of the presented user selectable options. For example, when the user selects the option to pause the primary content and view the supplemental content on the primary window of the user equipment device, the system removes one or more of the scheduled interruptions.

In another aspect of the disclosure herein, the frequency of the scheduled interruptions is adjusted based on a duration of the user interaction with the displayed supplemental content. For example, when the user merely interacts with the supplemental content for a minimal period of time (e.g., less than 5-10 seconds), the system may decide not to adjust the frequency of the scheduled interruption. In another embodiment, when the user interacts with the supplemental content for a threshold period of time (e.g., more than 30 seconds), the system may remove one or more of the scheduled interruptions. In another embodiment, the system may reduce the amount of time scheduled for the interruption to the primary content. Accordingly, the user is incentivized to interact with the supplemental content.

In accordance with one embodiment of the present disclosure, the supplemental content displayed on the user equipment device is personalized based on the user viewing the supplemental content. For instance, the system can retrieve a purchase history of the user to identify specific patterns favored by the user (e.g., specific colors for articles of clothing preferred by the user). The system then displays supplemental content such as an advertisement which features the product in the specific color preferred by the user. In another embodiment, the system displays supplemental content which feature the identified object (e.g., a specific pair of shoes worn by a character in the primary content). In this way, businesses are more likely to engage the consumers and increase effectiveness of their advertisements. Moreover, the users are more likely to identify products they are interested in and easily view supplemental content related to those products.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which.

DETAILED DESCRIPTION

Figure 1:
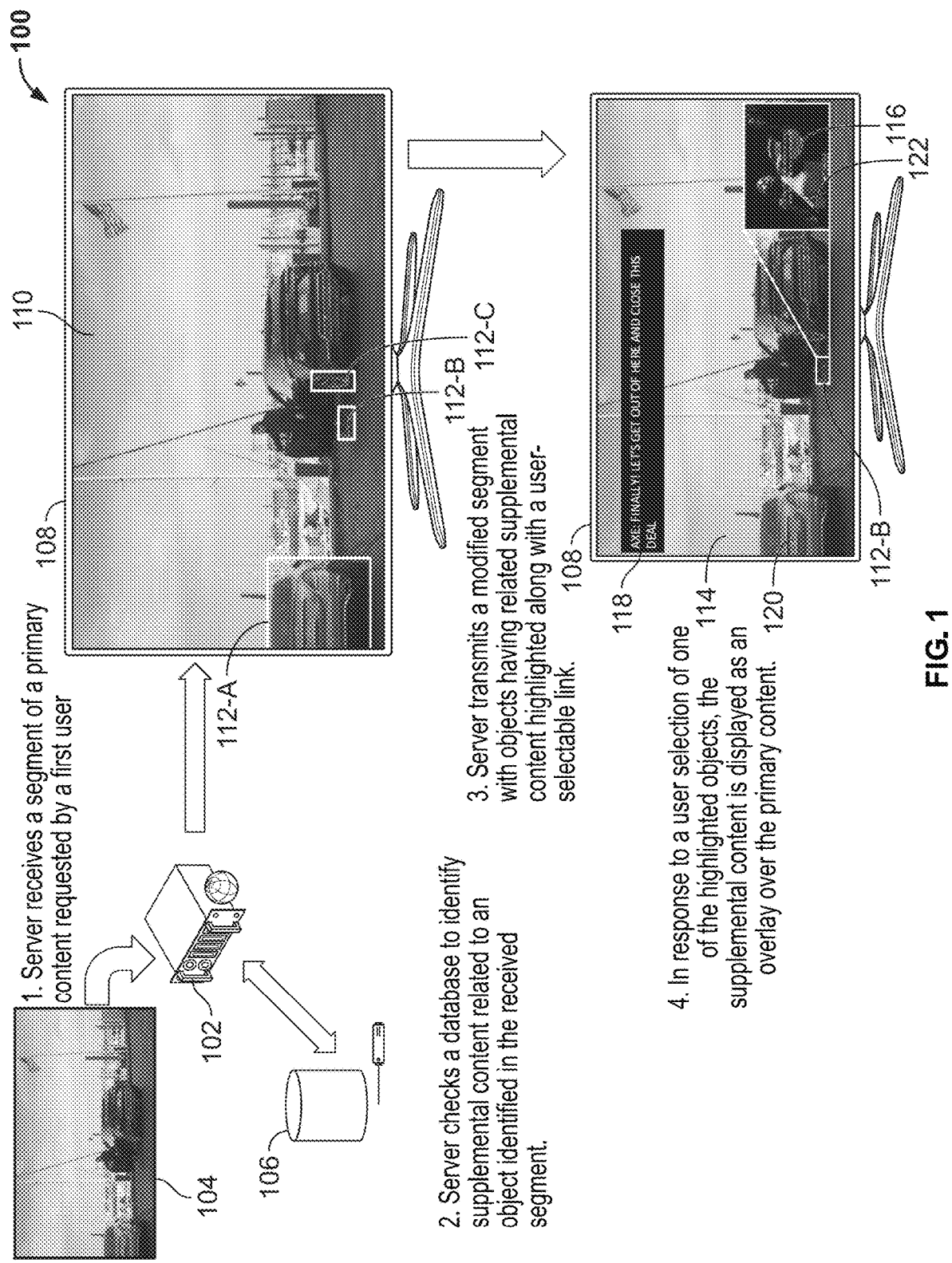
FIG. 1 shows an illustrative system for modifying display of segments of a primary content to highlight identified objects of interest, in accordance with some embodiments of this disclosure.

FIG. 1 shows an exemplary system 100 for modifying display of segments of a primary content to highlight identified objects that are likely to be of interest to a user viewing the primary content. As illustrated in FIG. 1, control circuitry 102 receives segment 104 of primary content to be displayed on user equipment device 108 for consumption. For example, control circuitry 102 receives a segment of the show "Billions". In an embodiment, control circuitry 102, in response to receiving a selection of a primary content (e.g., the show "Billions"), displays a user interface including a selectable option for providing interactive supplemental content during playback of the selected primary content. For example, the user is offered a first option to request highlighted objects of interest during playback of the primary content and a second option to consume the primary content without highlighting objects of interest. In an embodiment, control circuitry 102 performs the following processes in response to the user selecting the first option to request highlighting of objects of interest during playback of the primary content.

In an embodiment, control circuitry 102 analyzes the received segment to identify an object within the received segment. For example, control circuitry 102 employs an object recognition algorithm (e.g., a known object recognition algorithm such as Microsoft Azure Computer Vision) to identify one or more objects 112 present within the received segment. In an embodiment, a voice recognition interface (such as the one described below in connection with FIG. 3) can monitor utterances of the user during playback of the primary content to identify objects that are of interest to the user. For example, the voice recognition interface can determine that the user uttered the phrase, "that car looks nice!". In response, control circuitry 102 can use the object recognition algorithm discussed above to determine the presence of a vehicle within the received segment of the primary content. In the example illustrated in FIG. 1, control circuitry 102 analyzes the received segment of the show "Billions" in the manner discussed above to identify objects such as a vehicle 112-A (e.g., Mercedes sedan), a pair of shoes 112-B (e.g., Nike Ebernon) worn by a character, and a tire 112-C of a second vehicle (e.g., Bridgestone).

Control circuitry 102 then checks database 106 storing supplemental content related to a plurality of objects to determine whether supplemental content associated with the identified object is available. For example, control circuitry 102 checks database 106 to determine whether supplemental content related to the identified vehicle, tires, or pair of shoes are available. When supplemental content associated with the identified object is available within database 106, control circuitry 102 modifies the received segment 104 of the primary content. Specifically, content circuitry 102 modifies the received segment 104 of the primary content to highlight the identified objects 112. As illustrated in FIG. 1, in one example, control circuitry 102 adds a highlight around a border of the identified objects 112 in the modified segment 110. In various other embodiments, control circuitry 102 can highlight identified objects 112 by adding an icon next to the identified objects within the modified segment of the primary content. In still other embodiments, control circuitry 102 can highlight identified objects 112 in any suitable manner by visually distinguishing the identified objects 112 from other objects within the received segment (e.g., by shading an area of a frame where the identified objects 112 are located).

Control circuitry 102 then displays the modified segment 110 of the primary content on user equipment device 108 for consumption. As illustrated in FIG. 1, modified segment 114 displayed on user television equipment 108 includes highlighted objects 112-A (a vehicle), 112-B (a pair of shoes), and 112-C (tires of a vehicle).

Control circuitry 102 can identify a plurality of objects within received segment 104 of the primary content. In such an aspect, highlighting every identified object within received segment 104 of the primary content would overwhelm the user viewing the primary content and distract from enjoying the primary content. Accordingly, control circuitry 102 prioritizes one or two of the identified objects to be highlighted based on user preferences. Specifically, control circuitry 102 retrieves a web browsing history associated with the user consuming the primary content to identify products that the user may wish to purchase. For example, control circuitry 102 can determine that the user has recently searched extensively for new shoes and tires to purchase. In one embodiment, control circuitry 102 can retrieve social media activity of the user viewing the primary content to identify other interests of the user. For example, control circuitry 102 may determine, based on the retrieved social media activity, that the user has recently liked pictures and advertisements related to Mercedes sedans.

Upon determining a match between an identified object from the received segment of the primary content and the product identified from the retrieved user preferences, control circuitry 102 prioritizes the matching identified object. For example, as shown in FIG. 1, the Mercedes sedan 112-A, the pair of Nike Ebernon 112-B, and the Bridgestone tires 112-C are prioritized. Similarly, objects within the received segment 104 that do not match the retrieved user preferences are deprioritized. For example, objects such as a yacht shown in the background of the received segment 104 are deprioritized. Control circuitry 102 then modifies the received segment 104 of the primary content to highlight the highest priority objects (112-A, 112-B, and 112-C) and displays modified segment 110 on user equipment device 108.

In some embodiments, modifying the received segment of the primary content includes providing a user selectable link. For example, the user can use an input device such as a remote-control device to select a highlighted object within the displayed modified segment 110 of the primary content. In another embodiment, the user can provide a voice command using, for example, a microphone, to select a highlighted object within the displayed segment of the primary content. In an embodiment, a voice recognition interface (such as the one described below in connection with FIG. 3) can automatically monitor voice interactions of the user during playback of the primary content to detect an utterance corresponding to an object.

As illustrated in FIG. 1, the user selects the identified pair of shoes 112-B from the displayed modified segment 110.

Control circuitry 102, in response to detecting that the user has selected one of the highlight objects 112 within the displayed modified segment 110 of the primary content (for instance, by receiving data indicative of a selection of the user selectable link), displays supplemental content 116 associated with the identified object 112 selected by the user. As shown in FIG. 1, control circuitry 102, in response to the user selecting the pair of shoes 112-B, displays an advertisement (i.e., supplemental content 116) on user equipment device 108.

In some embodiments, control circuitry 102, in response to detecting that the user has selected one of the highlight objects 112 within the displayed segment 110 of the primary content, prevents an audio component associated with the primary content from being output. For example, the system may mute the audio of the primary content while simultaneously displaying the supplemental content along with closed-captioning data associated with the primary content. As shown in FIG. 1, closed-captioning data 118 associated with the show "Billion" is displayed while simultaneously displaying the advertisement (i.e., supplemental content 116) associated with the selected pair of shoes 112-B. This ensures that the user can view the supplemental content including the audio component of the supplemental content while simultaneously following the primary content. In another embodiment, the supplemental content is displayed during a segment of the primary content where there is no dialogue between characters. For example, the system may delay the presentation of supplemental content until a segment of the primary content that does not include an audio component is displayed. This allows the user to engage with the supplemental content without missing the primary content.

As illustrated in FIG. 1, supplemental content 116 is displayed on user equipment device 108 simultaneously with the primary content. In the example illustrated in FIG. 1, the primary content is displayed on primary window 120 of user equipment device 108 with supplemental content 116 being displayed on secondary window 122 as an overlay over primary window 120. In another such aspect, the playback of the primary content is paused while supplemental content 116 is displayed on primary window 120.

Figure 2:
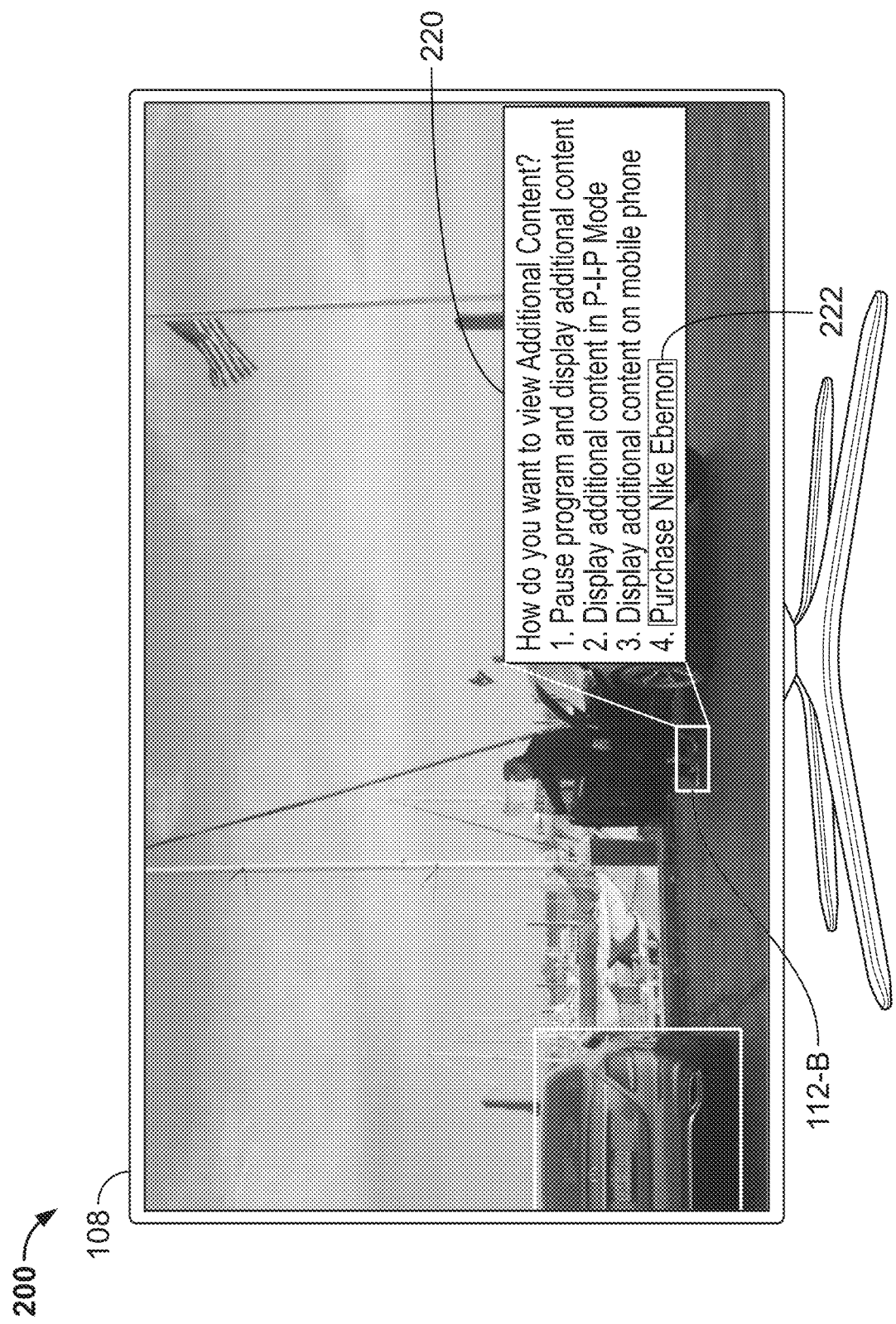
FIG. 2 shows an illustrative user interface showing user selectable options for interacting with supplemental content associated with a selected highlighted object, in accordance with some embodiments of this disclosure.

In an embodiment, control circuitry 102, in response to detecting that the user has selected one of the highlighted objects within the displayed segment of the primary content, displays a user selectable option for interacting with the supplemental content. FIG. 2 depicts an illustrative user interface 200 showing user selectable options 220 for interacting with supplemental content associated with a selected highlighted object, in accordance with some embodiments of this disclosure.

In one aspect shown in FIG. 2, user selectable option 220 is an option to interrupt playback of the primary content to display the supplemental content. For instance, playback of the show "Billions" (i.e., primary content) is paused while the advertisement (i.e., supplemental content) for the pair of shoes 112-B is displayed on primary window 120 of user equipment device 108. In an embodiment where segments of the primary content are being received from a broadcast source, control circuitry 102 buffers the primary content while displaying the supplemental content.

In another aspect, user selectable option 220 is an option to simultaneously display the primary content and the supplemental content, where the supplemental content is displayed in a picture-in-picture mode on a secondary window overlaid over a primary window. For example, as illustrated in FIG. 1, the show "Billions" (i.e., primary content) is displayed on primary window 120 while the advertisement (i.e., supplemental content) for the pair of shoes 112-B is displayed on secondary window 122 of user equipment device 108. Although not illustrated in FIG. 2, in an embodiment, control circuitry 102 may generate a zoomed-in image of the identified object in the secondary window. In still another embodiment, the secondary window displays textual description associated with the identified object instead of or in addition to the zoomed-in image of the identified object.

In still another aspect, user selectable option 220 is an option to display the supplemental content for display on a second user equipment device. For example, control circuitry 102 displays an advertisement (i.e., the supplemental content) for the pair of shoes 112-B to a mobile device of the user so that the user can view the advertisement without interrupting the playback of the show "Billions" (i.e., the primary content). In another aspect, user selectable option 220 is an option to view a purchase offer related to the identified object. As illustrated in FIG. 2, control circuitry 102 presents a Uniform Resource Locator (URL) to direct the user to a web resource where the user can purchase the identified pair of shoes 112-B. In another embodiment, control circuitry 102 can display product reviews of the highlighted object selected by the user. As illustrated in FIG. 2, control circuitry 102 displays one or more of user selectable options 220 to be displayed on user equipment device 108 in response to detecting that the user has selected one of the highlighted objects 112 within the displayed segment 114 of the primary content. As further illustrated in FIG. 2, control circuitry 102 allows a user to scroll through user selectable options 220 and select option 222 to purchase the pair of shoes 112-B.

In accordance with some aspects of the subject matter disclosed herein, the primary content may have scheduled interruptions during which advertising content is conventionally displayed. In one aspect of the present disclosure, control circuitry 102 determines which of the presented user selectable options 220 was selected by the user. Control circuitry 102 then adjusts a frequency of the scheduled interruptions based on the determined selection 222 of the presented user selectable options 220. For example, when the user selects the option to pause the primary content and view the supplemental content on the primary window of the user equipment device, control circuitry 102 removes one or more of the scheduled interruptions.

In another aspect of the disclosure herein, the frequency of the scheduled interruptions is adjusted based on a duration of the user interaction with the displayed supplemental content. For example, when the user merely interacts with the supplemental content for a minimal period of time (e.g., less than 5-10 seconds), control circuitry 102 determines not to adjust the frequency of the scheduled interruption. In another embodiment, when the user interacts with the supplemental content for a threshold period of time (e.g., more than 30 seconds), control circuitry 102 removes one or more of the scheduled interruptions. In another embodiment, control circuitry 102 reduces the amount of time scheduled for the interruption to the primary content. Accordingly, the user is incentivized to interact with the supplemental content.

In one embodiment, the supplemental content displayed on user equipment device 108 is personalized based on the user viewing the supplemental content. For instance, control circuitry 102 retrieves a purchase history of the user to identify specific patterns favored by the user (e.g., specific colors for articles of clothing preferred by the user). Control circuitry 102 then displays supplemental content such as an advertisement which features the product in the specific color preferred by the user. In another embodiment, control circuitry 102 displays supplemental content which feature the identified object (e.g., a specific pair of shoes worn by a character in the primary content). In this way, businesses are more likely to engage the consumers and increase effectiveness of their advertisements. Moreover, the users are more likely to identify products they are interested in and easily view supplemental content related to those products.

In accordance with an embodiment, control circuitry 102 may be part of user television equipment 108. In such an embodiment, a processor (control circuitry 102) at the user television equipment 108 receives segments of the primary content from a server along with a manifest file associated with the primary content. The control circuitry 102 at the user television equipment 108 parses the manifest file to determine scheduled advertisement breaks. Moreover, control circuitry 102 at the user television equipment 108 also retrieves supplemental content (e.g., supplemental content 116 discussed above) from a remote database (e.g., database 106 discussed above) and stitches together the primary content along with the supplemental content. Control circuitry 102 at the user television equipment then modifies the display based on user selection of one or more of the highlighted objects and/or user-selectable options. Although the above embodiment described control circuitry 102 stitching together the primary content along with the supplemental content, it is not necessary to do so. In an embodiment, the supplemental content is displayed as an overlay over the primary content. Moreover, as described below, the manifest file received at user television equipment 108 may, in one embodiment, not include the supplemental content (e.g., advertising content). Instead, a plurality of URLs are received from an advertising server corresponding to the identified objects separate from the manifest file as discussed below.

In another embodiment, control circuitry 102 may be part of a media content server remote from user television equipment 108. In such an embodiment, the media content server receives segments of the primary content from a media content owner server (e.g., Showtime server providing segments of the program "Billions"). The media content server also receives advertising content from an advertisement server to be displayed during the display of the primary content. The media content server then stitches together the advertising content with the primary content and generates a manifest file for the combined content. The combined content along with the manifest file is then transmitted to, for instance, the user television equipment 108. Additional detail about the structure and operation of control circuitry 102 will be described in greater detail below in connection with the discussion of FIGS. 3 and 4.

In another embodiment, media content server does not stitch together the advertising content with the primary content. Instead, media content server generates an Extensible Markup Language (XML) file or a file that stores simple data structures and objects in JavaScript Object Notation (JSON) format. More particularly, media content server generates an XML file or JSON file which includes URLs corresponding to the supplemental content (e.g., advertising content) corresponding to various objects within the received segment of the primary content. In addition, media content server can include, within the XML file or JSON file, information indicative of location of an object of interest within each frame of the segment of the primary content (e.g., pixel location information where the identified object is to be displayed). Moreover, media content server can further include, within the XML file or JSON file, information indicative of location where and how the highlight is to be generated for display. For example, media content server can provide information instructing user television equipment 108 to generate for display a yellow colored rectangular box at a location corresponding to an object of interest within the segment of the primary content. In such an embodiment, user television equipment 108, in response to receiving the manifest file and the XML or JSON file, can merely generate for display the primary content and the highlighting based on display signals received from the media content server. In response to receiving a user selection of a highlighted object, user television equipment can retrieve supplemental content using URL information stored in the received XML or JSON file. In another embodiment, in response to receiving a user selection of a highlighted object, user television equipment can transmit a request to the media content server for supplemental content. In such an embodiment, media content server can provide the supplemental content to user television equipment 108 along with information indicating where and how the supplemental content is to be displayed in an XML or JSON file accompanying the supplemental content data.

Figure 3:
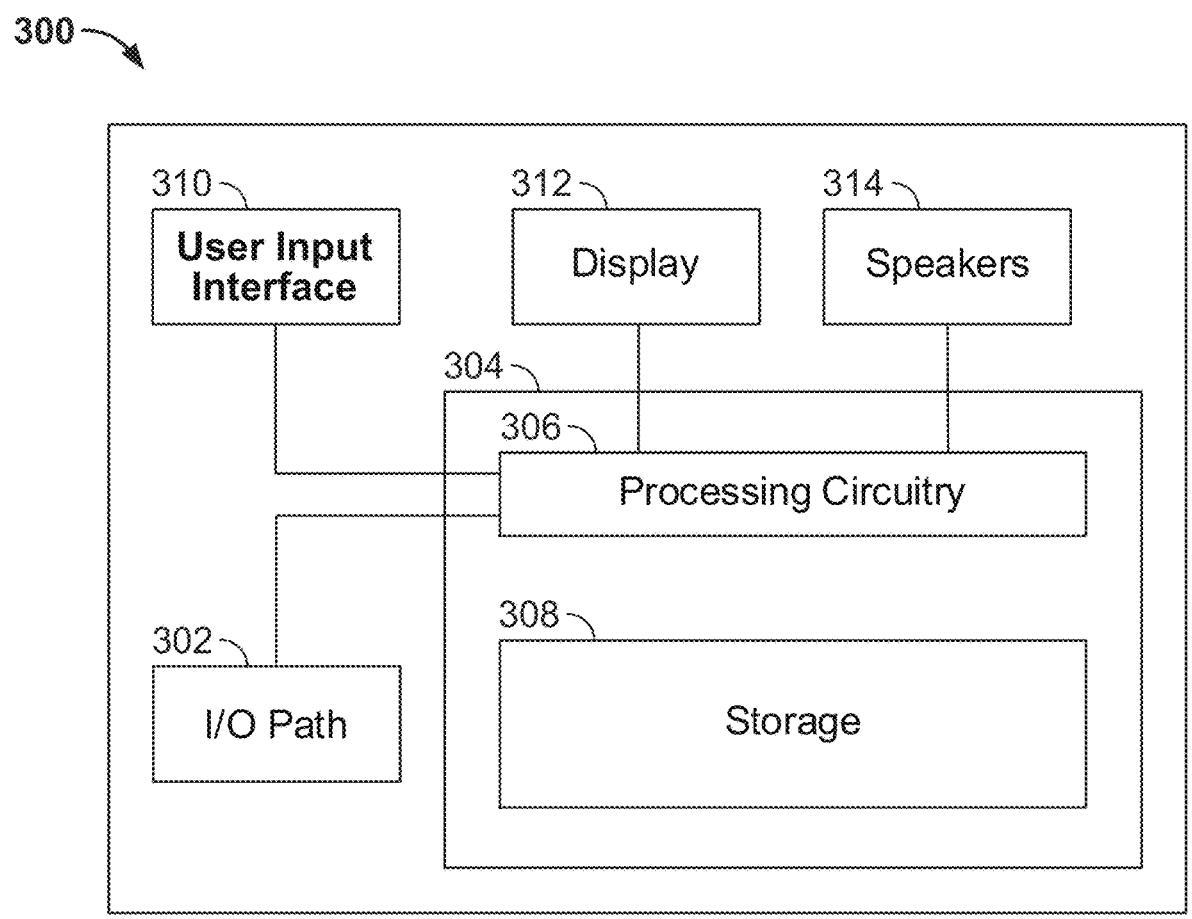
FIG. 3 shows a block diagram of an illustrative user equipment device used to begin a live media stream, in accordance with some embodiments of the disclosure.

FIG. 3 depicts a generalized embodiment of an illustrative device (e.g., user equipment device 204 or user equipment device 220) that is used to modify the received segments of the primary content. User equipment device 300 may be any of a plurality of user devices such as a smartphone, a tablet, personal computer, etc. (discussed further below with respect to FIG. 4). User equipment device 300 may transmit or receive the live media stream data via input/output (hereinafter "I/O") path 302. I/O path 302 may provide the live media stream data (e.g., content item available over LAN or WAN, and the like) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below in relation to FIG. 4). I/O functions may be provided by one or more of these communications paths but are shown as a single path in FIG. 3 to avoid overcomplicating the drawing.

Control circuitry 304 may be based on any suitable processing circuitry such as processing circuitry 306. Processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., quad-core). In some embodiments, processing circuitry may be distributed across multiple separate processor or processing units, for example, multiple of the same type of processing units (e.g., two Intel Core i7 processors) or multiple different processors (e.g., Ryzen processor with integrated CPU and GPU processing cores) or may include a multi-core processor (e.g., dual-core, quad-core, hexa-core, or any suitable number of cores) or supercomputer. In some embodiments, control circuitry 304 executes instructions for an application stored in memory (e.g., memory 308). Specifically, control circuitry 304 may be instructed by a media application to perform the functions discussed above and below. For example, the media application may provide instructions to control circuitry 304 to modify segments of the primary content to highlight certain objects. Moreover, the media application may also collect user preference information and select suitable supplemental content. In some implementations, any action performed by control circuitry 304 may be based on instructions received from the media application.

Control circuitry 304 may include tuning circuitry, such as one or more analog tuners, one or more MP3 decoders or other digital decoding circuitry, or any other suitable tuning or audio circuits or combinations of such circuits. Encoding circuitry (e.g., for converting analog or digital signals to signals for storage in memory 308) may also be provided. Control circuitry 304 may also include scaler circuitry for upconverting and down converting content item into the preferred output format of user equipment device 300, and converter circuitry for converting between digital and analog signals. The tuning and encoding circuitry may be used by user equipment device 300 to receive, play, and buffer content item. The circuitry described herein, including for example, the tuning, audio generating, encoding, decoding, encrypting, decrypting, scaler, and analog/digital circuitry, may be implemented using software running on one or more general purpose or specialized processors. If storage 308 is provided as a separate device from user equipment device 300, the tuning and encoding circuitry may be associated with storage 308.

Storage 308 may be any device for storing electronic data, such as random-access memory, solid state devices, quantum storage devices, hard disk drives, non-volatile memory or any other suitable fixed or removable storage devices, and/or any combination of the same. Control circuitry 304 may allocate portions of storage 308 for various purposes such as caching application instructions, recording media assets, storing portions of a media asset, buffering segments of media, etc. As described herein, storage 308 may be used to store one or more LUTs storing a number of MAC addresses associated with a plurality of user equipment devices and their corresponding profile information.

A user may send instructions to control circuitry 304 using user input interface 310. User input interface 310 may be any suitable user input interface, such as a touchscreen as shown in FIG. 1, mouse, trackball, keypad, keyboard, touchpad, stylus input, joystick, voice recognition interface, or other user input interfaces. Instructions to control circuitry 304 may be transmitted through I/O path 302, that could consist of a video tracking and detection mechanism, Internet of Things (IoT) and home automation triggers, emergency alert systems, and software or hardware communication pipelines and/or notification centers.

Display 312 may be provided as a stand-alone device or integrated with other elements of each one of user equipment device 300. For example, display 312 may be a touchscreen or touch-sensitive display, a projector, or a casting device. In such circumstances, user input interface 310 may be integrated with or combined with display 312. Display 312 may be one or more of a monitor, a television, a liquid-crystal display (LCD) for a mobile device, silicon display, e-ink display, light-emitting diode (LED) display, or any other suitable equipment for displaying visual images. Graphics processing circuitry may generate the output to the display 312. In some embodiments, the graphics processing circuitry may be external to processing circuitry 306 (e.g., as a graphics processing card that communicates with processing circuitry 306 via I/O path 302) or may be internal to processing circuitry 306 or control circuitry 304 (e.g., on a same silicone die as control circuitry 304 or processing circuitry 306). In some embodiments, the graphics processing circuitry may be used to receive, display, and play the media asset.

Speakers 314 may be provided as integrated with other elements of user equipment device 300 or may be stand-alone units. The audio component of videos and other media asset displayed on display 312 may be played through speakers 314. In some embodiments, the audio may be distributed to a receiver (not shown), which processes and outputs the audio via speakers 314. The speakers 314 may be part of, but not limited to, a home automation system. In some embodiments, speakers 314 may also include a microphone to receive audio input from the first user starting the live media stream.

The media application may be implemented using any suitable architecture. For example, it may be a stand-alone application wholly implemented on user equipment device 300. The user interface application and/or any instructions for performing any of the embodiments discussed herein may be encoded on computer-readable media. Computer-readable media includes any media capable of storing data.

Figure 4:
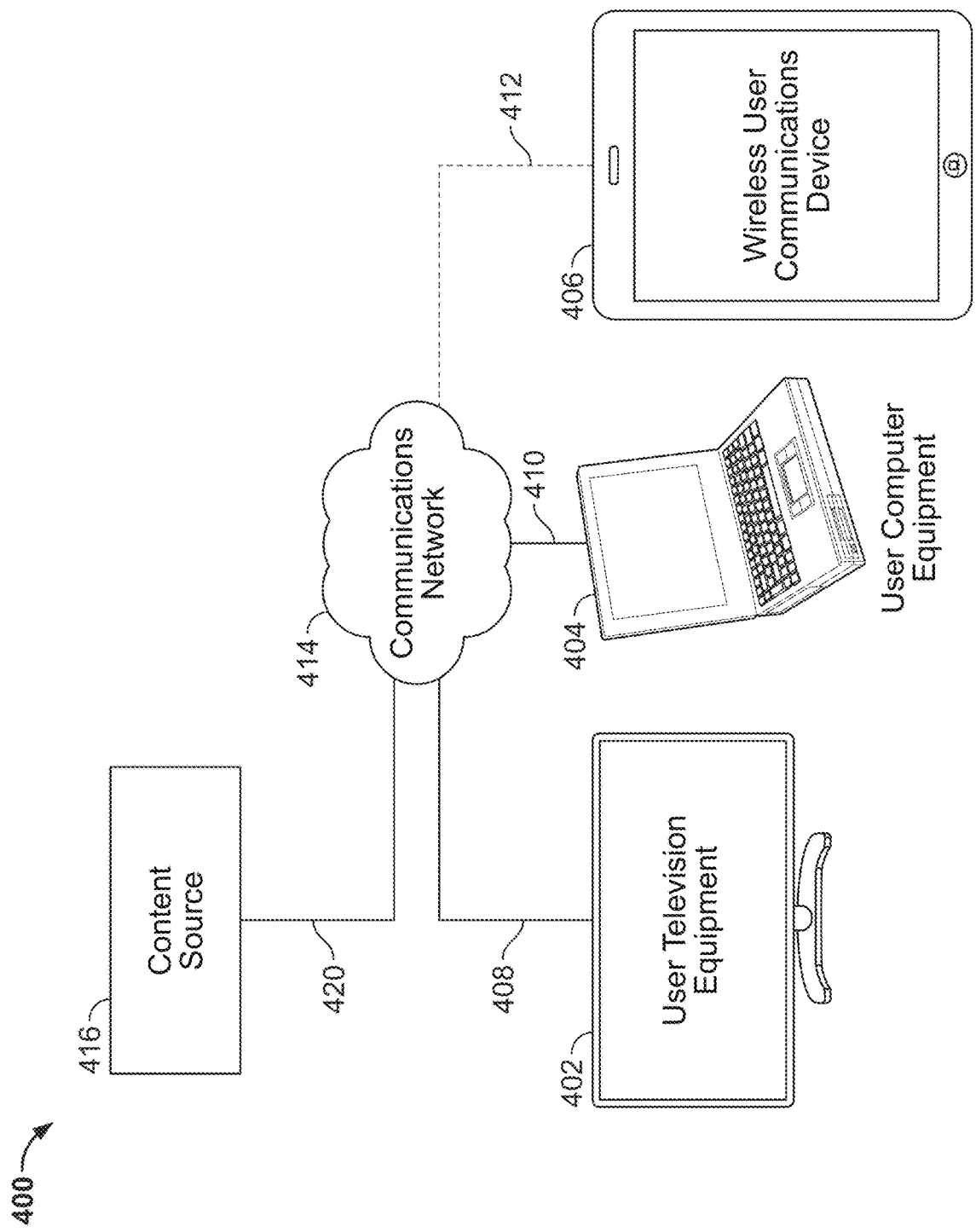
FIG. 4 shows a block diagram of an illustrative media system, in accordance with some embodiments of this disclosure.

FIG. 4 depicts an exemplary media system in accordance with some embodiments of the disclosure in which user equipment device 108 and user equipment device 300 can be implemented in system 400 of FIG. 4 as user television equipment 402, user computer equipment 404, wireless user communications device 406, or any other type of user equipment suitable for accessing media. For simplicity, these devices may be referred to herein collectively as user equipment. User equipment, on which the media application is implemented, may function as a stand-alone device or may be part of a network of devices. Various network configurations of devices may be implemented and are discussed in more detail below.

User television equipment 402 may include circuitry for receiving content over the Internet, a television set, a digital storage device, or other user television equipment. One or more of these devices may be integrated to be a single device, if desired. User computer equipment 404 may include a PC, a laptop, a streaming content item aggregator, a PC media center, or other user computer equipment. It may include devices like digital assistance, smart speakers, and/or home automation. Wireless user communications device 406 may include a smartphone, a portable video player, a portable music player, a portable gaming machine, a tablet, a wireless streaming device or other wireless device. It should be noted that the lines are blurred when trying to classify a device as one of the above devices and one device may be categorized into one or more of the categories listed above.

In system 400, there is typically more than one of each type of user equipment but only one of each is shown in FIG. 4 to avoid overcomplicating the drawing. In addition, each user may utilize more than one type of user equipment (e.g., a user may have a computer and a tablet) and also more than one of each type of user equipment device (e.g., a user may have multiple television sets).

The user equipment may be coupled to communications network 414. Namely, user television equipment 402, user computer equipment 404, and wireless user communications device 406 are coupled to communications network 414 via communications paths 408, 410, and 412, respectively. Communications network 414 is used by the user equipment to transmit or receive the live media stream. Communications network 414 may be one or more networks including the Internet, a mobile phone network, ad-hoc network, a Local Area network (LAN), or other types of communications network or combination of communications networks. Paths 408, 410, and 412 may separately or together include one or more communications paths, including any suitable wireless communications path. Paths 408 and 410 are drawn as solid lines to indicate they are wireless paths and path 412 is drawn as dotted line to indicate it is a wired path. Communications with the user equipment may be provided by one or more of these communications paths but are shown as a single path in FIG. 4 to avoid overcomplicating the drawing. The user equipment devices may communicate with each other directly through an indirect path via communications network 414.

System 400 includes content item source 416 coupled to communications network 414 via communications path 420. Path 420 may include any of the communications paths described above in connection with paths 408, 410, and 412. Communications with the content item source 416 may be exchanged over one or more communications paths but are shown as a single path in FIG. 4 to avoid overcomplicating the drawing. In addition, there may be more than one of content item source 416, but only one is shown in FIG. 4 to avoid overcomplicating the drawing. Although communications between source 416 with user equipment 402, 404, and 406 are shown as through communications network 414, in some embodiments, source 416 may communicate directly with user equipment devices 402, 404, and 406 via communications paths (not shown) such as those described above in connection with paths 408, 410, and 412.

Content item source 416 may include one or more types of media distribution equipment such as a media server, cable system headend, satellite distribution facility, intermediate distribution facilities and/or servers, Internet providers, on-demand media servers, and other media providers. Content item source 416 may be the originator of media content item or may not be the originator of media content item. Content item source 416 may also include a remote media server used to store different types of media content item (including live media stream data (e.g., a plurality of frames) uploaded by a user), in a location remote from any of the user equipment.

System 400 is intended to illustrate a number of approaches, or network configurations, by which user equipment devices and sources of media content item and guidance data may communicate with each other for the purpose of accessing media and data related to the media. The configuration of the devices and paths in system 400 may change without departing from the scope of the present disclosure.

Figure 5:
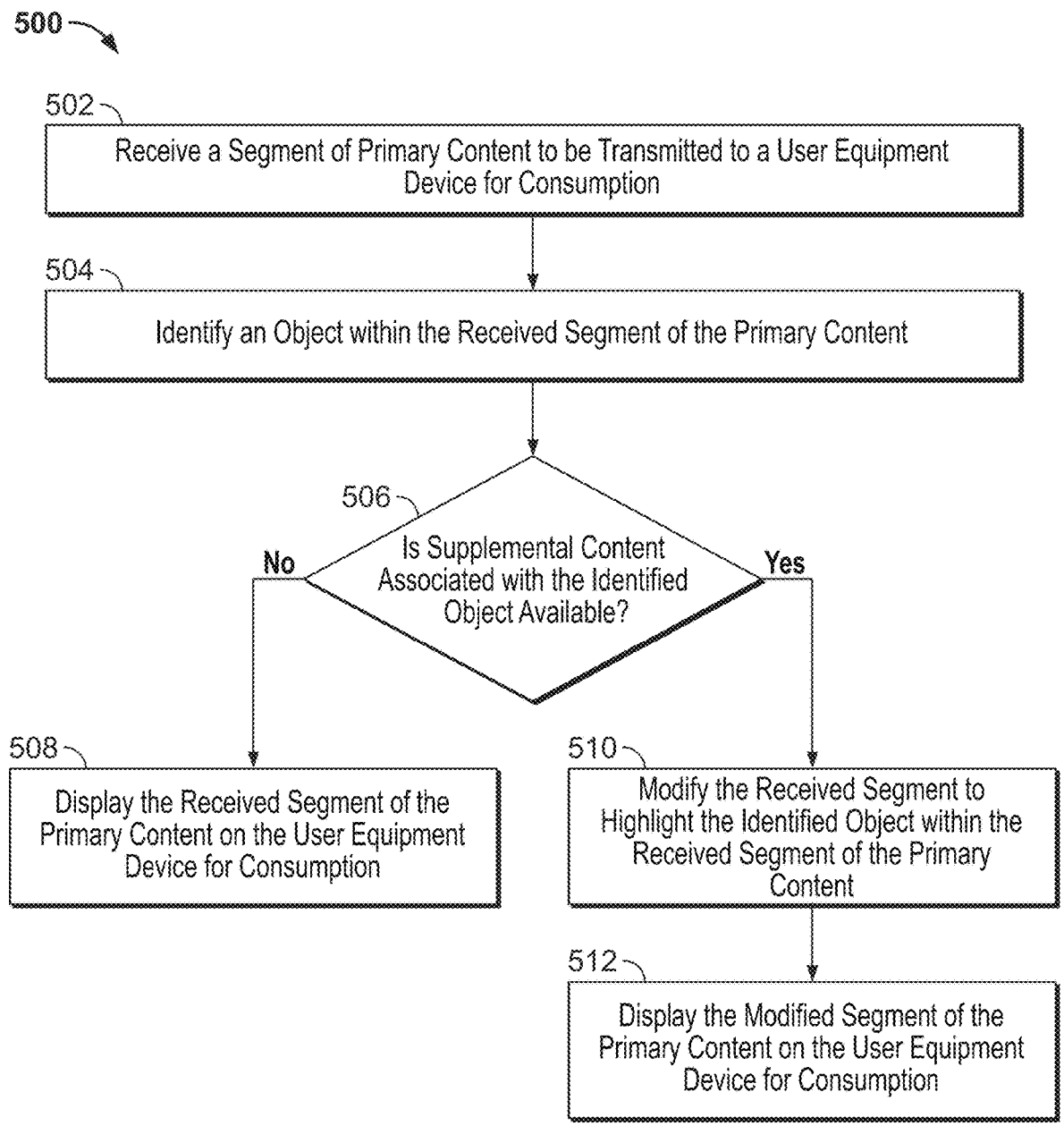
FIG. 5 is a flowchart of a detailed illustrative process for modifying display of segments of a primary content to highlight identified objects of interest, in accordance with some embodiments of this disclosure.

FIG. 5 depicts a flowchart of a detailed illustrative process 500 for modifying display of segments of a primary content to highlight identified objects of interest. In various embodiments, the individual steps of process 500 may be implemented by one or more components of the devices and systems of FIGS. 1-4. Although the present disclosure may describe certain steps of process 500 (and of other processes described herein) as being implemented by certain components of the devices and systems of FIGS. 1-4, this is for purposes of illustration only, and it should be understood that other components of the devices and systems of FIGS. 1-4 may implement those steps instead. For example, the steps of process 500 may be executed at control circuitry 102 of FIG. 1.

At 502, control circuitry 102 receives a segment of primary content (e.g., segment 104) to be displayed on a user equipment device (e.g., television 108) for consumption. For example, control circuitry 102 receives a segment of the show "Billions". At 504, control circuitry 102 analyzes the received segment to identify an object within the received segment. In one embodiment, control circuitry 102 employs an object recognition algorithm to identify one or more objects 112 present within the received segment 104. In the example illustrated in FIG. 1, control circuitry 102 analyzes the received segment of the show "Billions" to identify objects such as a vehicle 112-A (e.g., Mercedes sedan), a pair of shoes 112-B (e.g., Nike Ebernon) worn by a character, and a tire 112-C of a second vehicle (e.g., Bridgestone). In additional embodiments, control circuitry 102 can analyze, for example, a color gradient of each frame of the received segment 104 to identify regions of the frame with richer detail in order to identify objects present within the received segment 104.

At 506, control circuitry 102 then checks a database (e.g., database 106) storing supplemental content related to a plurality of objects to determine whether supplemental content associated with the identified object is available. For example, control circuitry 102 checks database 106 to determine whether supplemental content related to the identified vehicle, tires, or pair of shoes are available. When supplemental content associated with the identified object is available within database 106 (YES at 506), process 500 proceeds to 510 where control circuitry 102 modifies the received segment 104 of the primary content. Specifically, content circuitry 102 modifies the received segment 104 of the primary content to highlight the identified objects 112. As illustrated in FIG. 1, in one example, control circuitry 102 adds a highlight around a border of the identified objects 112 in the modified segment 110. In various other embodiments, control circuitry 102 can highlight identified objects 112 by adding an icon next to the identified objects within the modified segment of the primary content.

At 512, control circuitry 102 then displays the modified segment 110 of the primary content on user equipment device (e.g., television 108) for consumption. As illustrated in FIG. 1, modified segment 114 displayed on the user equipment device (e.g., television 108) includes highlighted objects 112-A (a vehicle), 112-B (a pair of shoes), and 112-C (tires of a vehicle).

If, on the other hand, control circuitry 102 determines that supplemental content associated with the identified object is not available (NO at 506), process 500 proceeds to 508 where control circuitry 102 displays the received segment of the primary content without any modification. In an embodiment, control circuitry 102, in response to determining that supplemental content associated with the identified object is not available (NO at 506), nevertheless modifies the received segment to highlight the identified object. In such an embodiment, upon detecting that the user has selected a highlighted object (described in greater detail below in connection with the discussion of FIG. 6) that does not have corresponding supplemental content available, generates a search string which includes the identified object and displays the search results for the generated search string on the user equipment device. In an embodiment, the search results can be displayed on a second user equipment device (e.g., a mobile phone) so as to avoid interrupting playback of the primary content.

Figure 6:
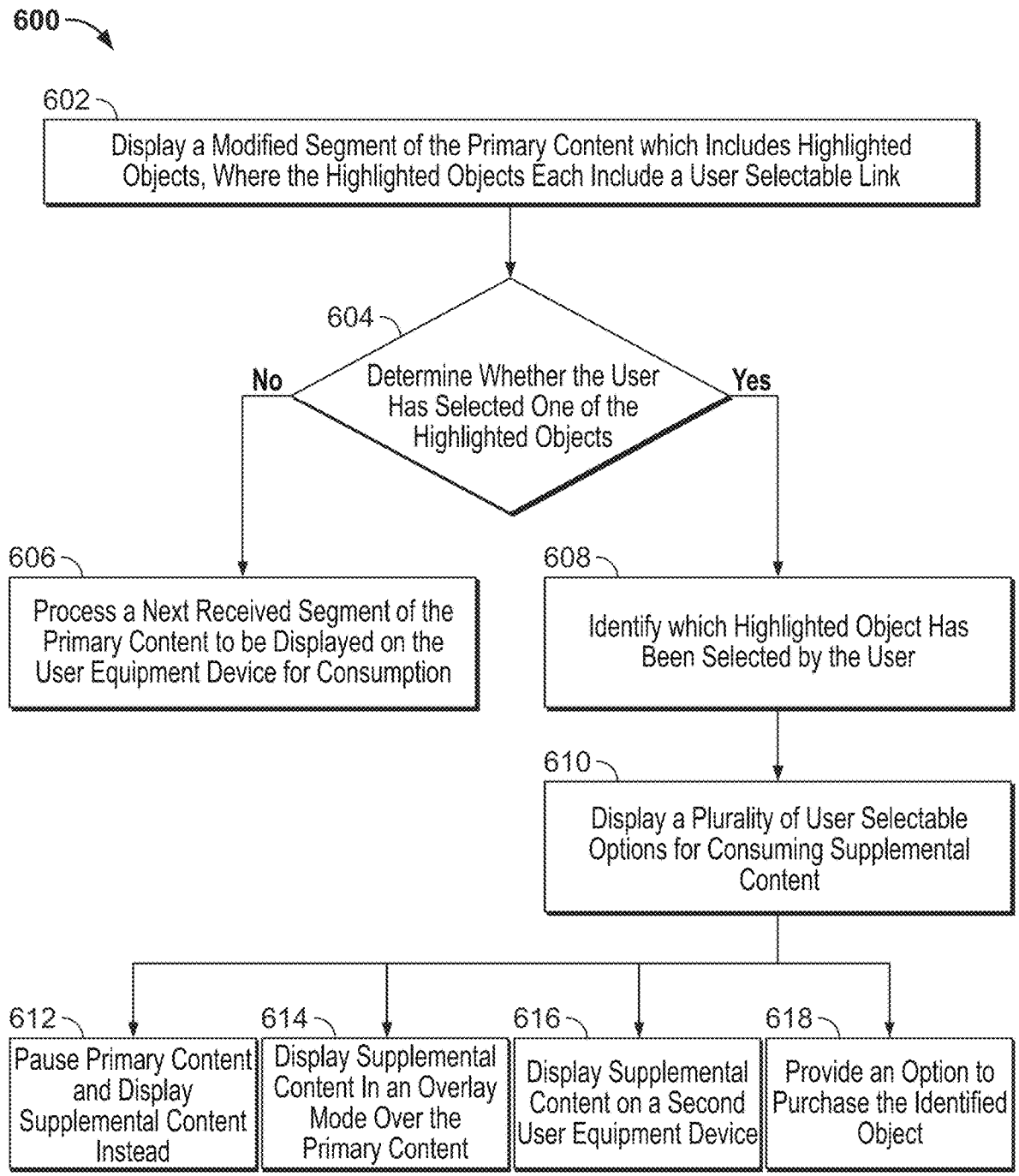
FIG. 6 shows a flowchart of a detailed illustrative process for providing user selectable options for interacting with supplemental content, in accordance with some embodiments of this disclosure.

FIG. 6 is a flowchart of a detailed illustrative process 600 for presenting supplemental content to the user, in accordance with some embodiments of this disclosure. In various embodiments, the individual steps of process 600 may be implemented by one or more components of the devices and systems of FIGS. 1-4. Although the present disclosure may describe certain steps of process 600 (and of other processes described herein) as being implemented by certain components of the devices and systems of FIGS. 1-4, this is for purposes of illustration only, and it should be understood that other components of the devices and systems of FIGS. 1-4 may implement those steps instead. For example, the steps of process 600 may be executed at control circuitry 102 of FIG. 1.

At 602, control circuitry 102 displays the modified segment of the primary content which includes highlighted objects, where the highlighted objects each include a user selectable link. For example, the user can use an input device such as a remote-control device to select a highlighted object within the displayed modified segment 110 of the primary content. In another embodiment, the user can provide a voice command using, for example, a microphone, to select a highlighted object within the displayed segment of the primary content.

At 604, control circuitry 102 determines whether the user has selected one of the highlighted objects. For example, as discussed above, the user can use a remote-control device or a voice recognition interface to select one of the highlighted objects. If control circuitry 102 determines that the user has not selected one of the highlighted objects included in the modified segment (NO at 604), process 600 proceeds to 606 where the control circuitry 102 begins analyzing a next segment of the primary content.

On the other hand, process 600, in response to detecting that the user has selected one of the highlight objects 112 within the displayed modified segment 110 of the primary content (for instance, by receiving data indicative of a selection of the user selectable link) (YES at 604), process 600 proceeds to 608 where control circuitry 102 determines which of the highlighted objects selected by the user. For example, control circuitry 102 receives data indicating which of the highlighted objects was selected by the user from the voice recognition interface. At 610, control circuitry 102 displays a plurality of user selectable options for consuming supplemental content associated with the selected object. As discussed above in connection with FIG. 2, the plurality of user selectable options can include (i) a first user selectable option to interrupt playback of the primary content to display the supplemental content; (ii) a second user selectable to simultaneously display the primary content and the supplemental content (e.g., the supplemental content is displayed in a picture-in-picture mode or an overlay mode); (iii) a third user selectable option to display the supplemental content for display on a second user equipment device; or (iv) a fourth user selectable option to view a purchase offer related to the selected object. Based on a user selection at 610 from one of the displayed user selectable options, process 600 proceeds to one of 612, 614, 616, or 618 corresponding to the first, second, third, or fourth user selectable option, respectively. In an embodiment, the user can select more than one option for consuming the supplemental content. For example, the user can select the options to view the supplemental content in an overlay mode on television 108, while simultaneously receiving a link to purchase the selected object on a second user equipment device.

Figure 7:
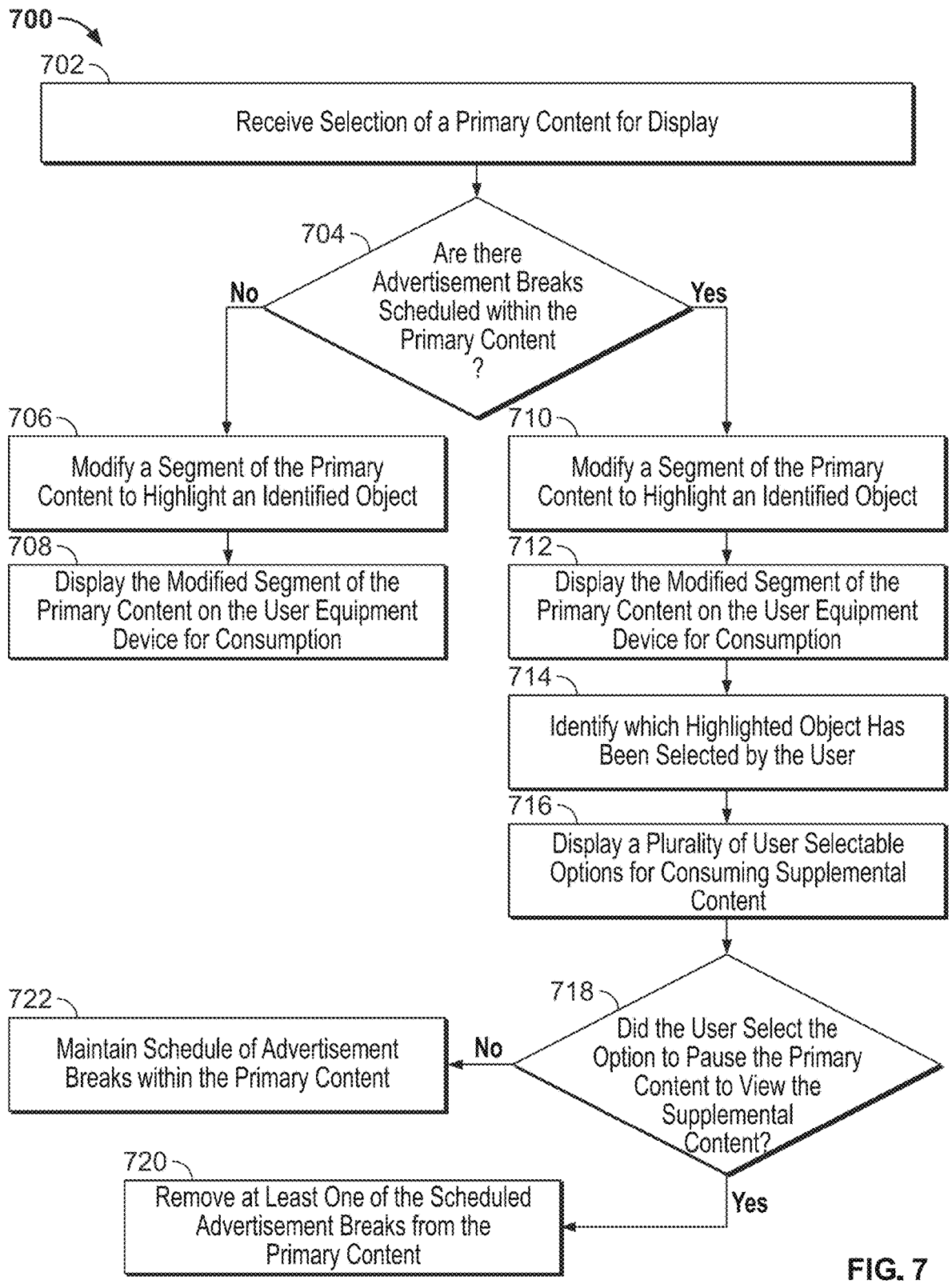
FIG. 7 is a flowchart of a detailed illustrative process 800 for adjusting a frequency of scheduled interruptions in the playback of the primary content based on a type of interaction with the supplemental content, in accordance with some embodiments of this disclosure.

FIG. 7 is a flowchart of a detailed illustrative process 700 for adjusting a frequency of scheduled interruptions in the playback of the primary content, in accordance with some embodiments of this disclosure. In various embodiments, the individual steps of process 700 may be implemented by one or more components of the devices and systems of FIGS. 1-4. Although the present disclosure may describe certain steps of process 700 (and of other processes described herein) as being implemented by certain components of the devices and systems of FIGS. 1-4, this is for purposes of illustration only, and it should be understood that other components of the devices and systems of FIGS. 1-4 may implement those steps instead. For example, the steps of process 700 may be executed at control circuitry 102 of FIG. 1.

At 702, control circuitry 102 receives a selection of a primary content for display. For example, as illustrated in FIG. 1, a user selects the program "Billions" to view using the television equipment 108. At 704, control circuitry 102 determines whether there are pre-scheduled advertisement breaks included in the display of the primary content. For example, information about scheduled in-video stream advertising such as the presentation of short video advertisements during display of the primary content (e.g., the program "Billions") can be retrieved from a manifest file (e.g., a M3U8 Audio playlist file) for the primary content. If, at 704, control circuitry 102 determines that there are no scheduled advertisement breaks within the primary content (NO at 704), process 700 proceeds to 706. At 706, control circuitry 102 modifies a segment of the primary content to highlight an identified object, as discussed above in greater detail. At 708, control circuitry 102 displays the modified segment of the primary content on the user equipment device.

On the other hand, when control circuitry 102 determines that there are pre-scheduled advertisement breaks included in the display of the primary content (YES at 704), process 700 proceeds to 710 where control circuitry 102 modifies a segment of the primary content to highlight an identified object, as discussed above in greater detail. At 712, control circuitry 102 displays the modified segment of the primary content on the user equipment device. At 714, control circuitry 102 identifies which highlighted object has been selected by the user. For example, control circuitry 102 receives data indicating which of the highlighted objects was selected by the user from the voice recognition interface.

At 716, control circuitry 102 displays a plurality of user selectable options for consuming supplemental content associated with the selected object. As discussed above in connection with FIG. 2, the plurality of user selectable options can include (i) a first user selectable option to interrupt playback of the primary content to display the supplemental content; (ii) a second user selectable to simultaneously display the primary content and the supplemental content (e.g., the supplemental content is displayed in a picture-in-picture mode or an overlay mode); (iii) a third user selectable option to display the supplemental content for display on a second user equipment device; or (iv) a fourth user selectable option to view a purchase offer related to the selected object.

At 718, control circuitry 102 determines whether the user selected the first user selectable option to interrupt playback of the primary content to display the supplemental content (i.e., the first user selectable option). If, at 718, control circuitry 102 determines that the user selected the first user selectable option to interrupt playback of the primary content to display the supplemental content (YES at 718), process 700 proceeds to 720 where control circuitry 102 removes at least one of the scheduled advertisement breaks from the primary content. For example, control circuitry 102 modifies the manifest file for the primary content to remove an advertisement break. If, on the other hand, control circuitry 102 determines that the user has not selected the first user selectable option to interrupt playback of the primary content to display the supplemental content (NO at 718), process 700 proceeds to 722 where control circuitry 102 maintains the schedule of advertisement breaks within the primary content.

In other embodiments, the scheduled advertisement breaks may be modified in a plurality of ways. For example, often there are multiple advertisements scheduled to be displayed during a scheduled advertisement break. In such an instance, based on the selection of the user selectable option, control circuitry modifies the number of advertisements displayed during an advertisement breaks while still maintaining the schedule of advertisement breaks. In an embodiment, the duration of each of the advertisement break is modified based on the user selection of one or more of the user selectable options for interacting with the supplemental content.

Figure 8:
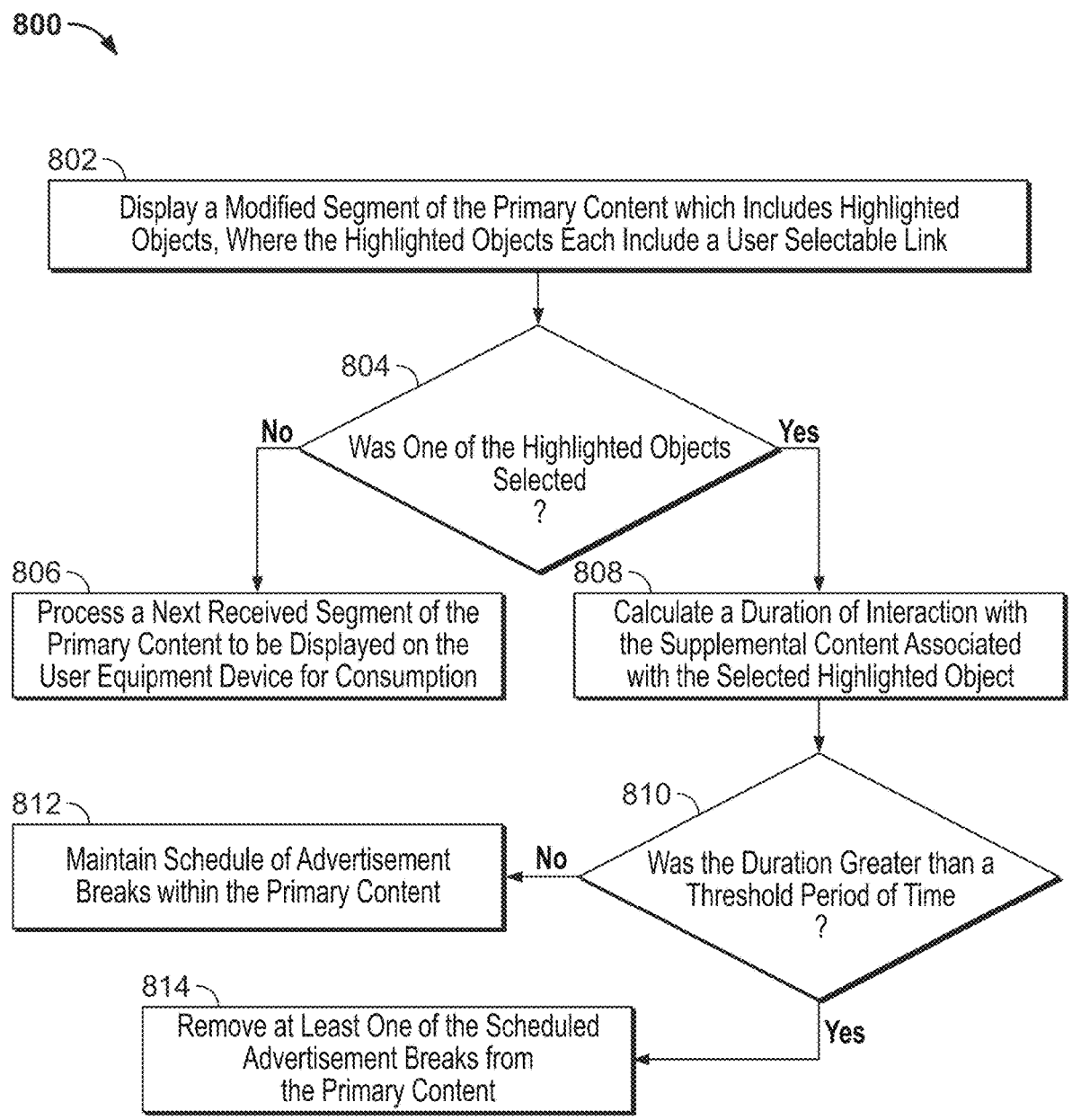
FIG. 8 is a flowchart of a detailed illustrative process 800 for adjusting a frequency of scheduled interruptions in the playback of the primary content based on a duration of interaction with the supplemental content, in accordance with some embodiments of this disclosure.

FIG. 8 is a flowchart of a detailed illustrative process 800 for adjusting a frequency of scheduled interruptions in the playback of the primary content, in accordance with some embodiments of this disclosure. In various embodiments, the individual steps of process 800 may be implemented by one or more components of the devices and systems of FIGS. 1-4. Although the present disclosure may describe certain steps of process 800 (and of other processes described herein) as being implemented by certain components of the devices and systems of FIGS. 1-4, this is for purposes of illustration only, and it should be understood that other components of the devices and systems of FIGS. 1-4 may implement those steps instead. For example, the steps of process 800 may be executed at control circuitry 102 of FIG. 1.

At 802, control circuitry 102 displays the modified segment of the primary content which includes highlighted objects, where the highlighted objects each include a user selectable link. For example, the user can use an input device such as a remote-control device to select a highlighted object within the displayed modified segment 110 of the primary content. In another embodiment, the user can provide a voice command using, for example, a microphone, to select a highlighted object within the displayed segment of the primary content.

At 804, control circuitry 102 determines whether the user has selected one of the highlighted objects. For example, as discussed above, the user can use a remote-control device or a voice recognition interface to select one of the highlighted objects. If control circuitry 102 determines that the user has not selected one of the highlighted objects included in the modified segment (NO at 804), process 800 proceeds to 806 where the control circuitry 102 begins analyzing a next segment of the primary content.

On the other hand, process 800, in response to detecting that the user has selected one of the highlighted objects 112 within the displayed modified segment 110 of the primary content (for instance, by receiving data indicative of a selection of the user selectable link) (YES at 804), process 800 proceeds to 808. At 808, control circuitry 102 calculates a duration of the interaction with the supplemental content associated with the selected highlighted object. For example, control circuitry 102 determines whether the user viewed an entire advertisement for the selected highlighted object or merely skipped the advertisement after viewing the first few seconds of the advertisement.

At 810, control circuitry 102 determines whether the duration of interaction was greater than a threshold period of time. In an embodiment, the threshold period of time may be, for example, 30 seconds. If, at 810, control circuitry 102 determines that the user interacted with the supplemental content for a duration greater than the threshold period of time (YES at 810), process 800 proceeds to 814 where control circuitry 102 removes at least one of the scheduled advertisement breaks from the primary content. For example, control circuitry 102 modifies the manifest file for the primary content to remove an advertisement break. If, on the other hand, control circuitry 102 determines that the user has not interacted with the supplemental content for a duration less than or equal to the threshold period of time (NO at 810), process 800 proceeds to 812 where control circuitry 102 maintains the schedule of advertisement breaks within the primary content.

In other embodiments, the threshold period of time can be dynamically set based on the selection of one of the plurality of user selectable options presented to the user (as discussed above in connection with FIG. 2). For example, the frequency of the scheduled advertisement breaks is adjusted based on a duration of the user interaction with the displayed supplemental content as well as the type of user interaction with the displayed supplemental content. For example, when the user merely interacts with the supplemental content for a minimal period of time (e.g., less than 30 seconds) when the supplemental content is an advertisement, control circuitry 102 determines not to adjust the frequency of the scheduled interruption. In another embodiment, when the user merely interacts with the supplemental content for a minimal period of time (e.g., less than 30 seconds) but the supplemental content is a link to purchase the identified object and the user completes the purchase, control circuitry 102 removes one or more of the scheduled interruptions.

Figure 9:
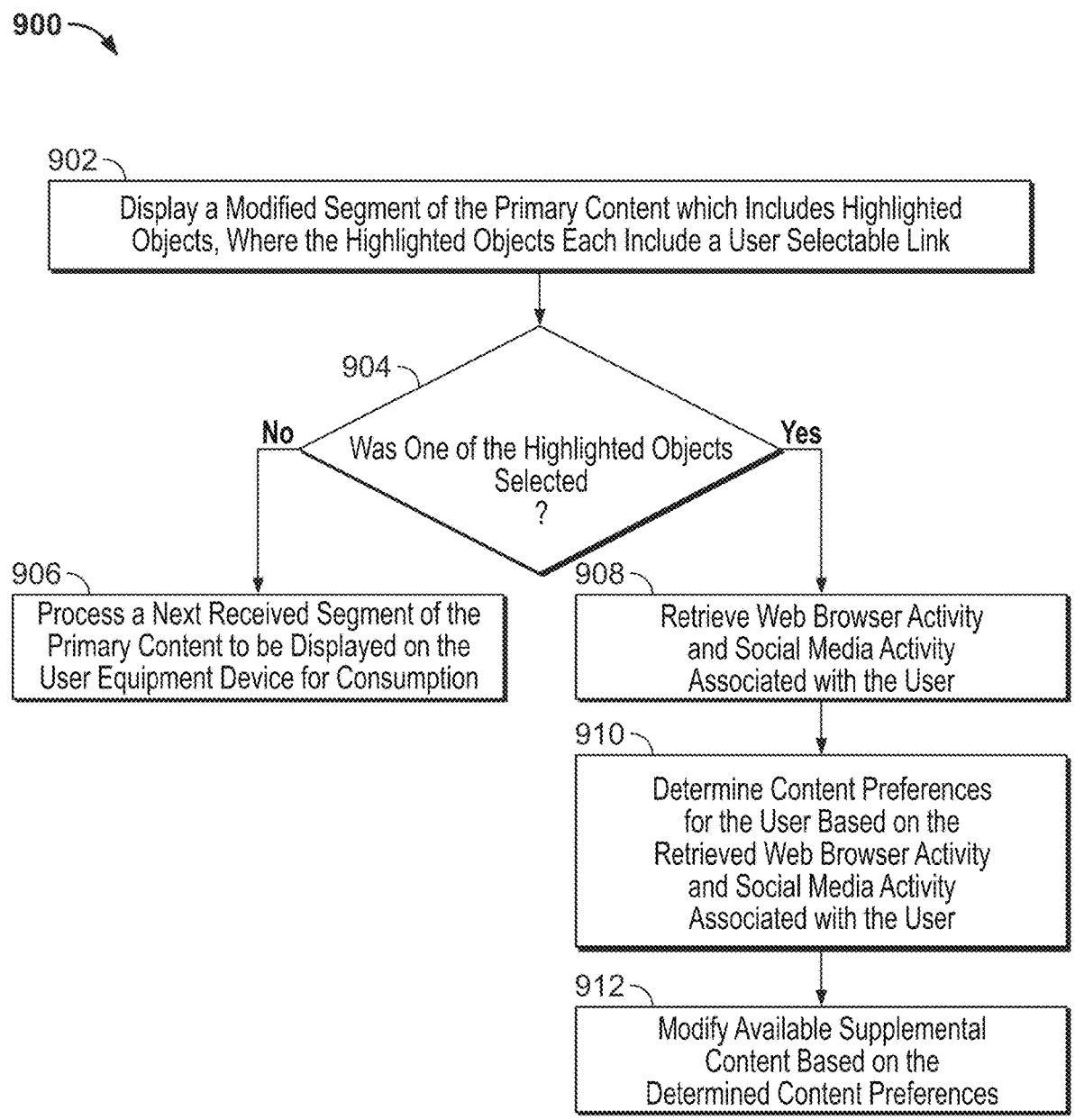
FIG. 9 is a flowchart of a detailed illustrative process for generating personalized supplemental content, in accordance with some embodiments of this disclosure.

FIG. 9 is a flowchart of a detailed illustrative process 900 for generating personalized supplemental content, in accordance with some embodiments of this disclosure. In various embodiments, the individual steps of process 900 may be implemented by one or more components of the devices and systems of FIGS. 1-4. Although the present disclosure may describe certain steps of process 900 (and of other processes described herein) as being implemented by certain components of the devices and systems of FIGS. 1-4, this is for purposes of illustration only, and it should be understood that other components of the devices and systems of FIGS. 1-4 may implement those steps instead. For example, the steps of process 900 may be executed at control circuitry 102 of FIG. 1.

At 902, control circuitry 102 displays the modified segment of the primary content which includes highlighted objects, where the highlighted objects each include a user selectable link. For example, the user can use an input device such as a remote-control device to select a highlighted object within the displayed modified segment 110 of the primary content. In another embodiment, the user can provide a voice command using, for example, a microphone, to select a highlighted object within the displayed segment of the primary content.

At 904, control circuitry 102 determines whether the user has selected one of the highlighted objects. For example, as discussed above, the user can use a remote-control device or a voice recognition interface to select one of the highlighted objects. If control circuitry 102 determines that the user has not selected one of the highlighted objects included in the modified segment (NO at 904), process 900 proceeds to 906 where the control circuitry 102 begins analyzing a next segment of the primary content.

On the other hand, process 900, in response to detecting that the user has selected one of the highlighted objects 112 within the displayed modified segment 110 of the primary content (for instance, by receiving data indicative of a selection of the user selectable link) (YES at 904), process 900 proceeds to 908. At 908, control circuitry 102 retrieves a web browsing history associated with the user consuming the primary content to identify products that the user may wish to purchase. In addition, at 908, control circuitry 102 can retrieve social media activity of the user viewing the primary content to identify other interests of the user. At 910, control circuitry 102 determines content preferences for the user based on the retrieved web browser activity and the social media activity associated with the user. For example, control circuitry 102 can determine that the user has recently searched extensively for new shoes and tires to purchase. Moreover, control circuitry 102 can determine, based on the retrieved social media activity, that the user has recently liked pictures and advertisements related to Mercedes sedans.

At 912, control circuitry 102 modifies the available supplemental content retrieved from database 106 based on the determined content preferences. For example, control circuitry 102, based on prior shoe purchases of the user, can infer that the user prefers sneakers in the color blue. Accordingly, at 912, control circuitry 102 modifies the supplemental content (e.g., an advertisement for the selected pair of shoes) to include sneakers in the color blue in order to match the user's preferences. In another example, where the supplemental content is an advertisement for tires, control circuitry 102 can modify the supplemental content to feature the tires on a vehicle owned by the user in order to engage the user and increase the effectiveness of the advertisement. In another embodiment, control circuitry 102 modifies the supplemental content based on a geographic location of the user.

In an embodiment, control circuitry 102 can automatically add the selected highlighted object to a shopping wish list associated with the user. In another embodiment, control circuitry 102 provides the user an option to "like" or "dislike" one or more of the highlighted objects. Control circuitry 102, maintains a preference indication associated with a highlighted object (e.g., selection of a "like" or "dislike" option) in order to inform future analysis of received segments of the primary content being consumed by the user. For example, when a user "dislikes" an automobile, control circuitry 102 deprioritizes highlighting of automobiles in additional segments of the primary content.

In some instances, users may be interested in viewing scheduled advertising content but nevertheless miss it because they are unaware of the specific advertisements scheduled to be displayed during an upcoming advertisement break. Accordingly, in some embodiments, control circuitry 102 highlights objects corresponding to an upcoming scheduled advertisement in order to allow the user to view the desired advertisement before the scheduled advertisement break. In some embodiments, control circuitry 102 modifies the segment of the primary content to highlight objects corresponding to an upcoming scheduled advertisement in order to inform the user of the upcoming scheduled advertisement without providing the option to view the advertisement immediately. For example, in an embodiment where the primary content is being received from a broadcast source, control circuitry 102 may determine to display the desired advertisement during the scheduled advertising break instead of buffering the broadcast content while displaying the desired advertisement immediately. In still another embodiment, highlighted objects having supplemental content available for immediate viewing may be visually distinguished from objects highlighted to indicate an upcoming advertisement scheduled to be displayed during the next advertising break.

The processes described above are intended to be illustrative and not limiting. One skilled in the art would appreciate that the steps of the processes discussed herein may be related causally (i.e., in response), omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   receiving a segment of primary content to be displayed on a user equipment device for consumption;
   analyzing the received segment to identify an object within the received segment of the primary content;
   determining whether supplemental content associated with the identified object is available;
   in response to determining that supplemental content associated with the identified object is available:
   determining whether the received segment of the primary content includes an audio component; and
   modifying, in response to determining that the received segment of the primary content does not include an audio component, the received segment of the primary content to highlight the identified object; and
   displaying the modified segment of the primary content on the user equipment device for consumption.

2. The method of claim 1, wherein modifying the received segment of the primary content includes providing a user selectable link; and
   the method further comprising: receiving data indicative of a selection of the user selectable link; and in response to receiving data indicative of the selection of the user selectable link, displaying the supplemental content associated with the identified object on the user equipment device for consumption.

3. The method of claim 2, further comprising: in response to receiving data indicative of the selection of the user selectable link: preventing an audio component associated with the primary content from being output; and
   simultaneously displaying closed-captioning data associated with the primary content and the supplemental content on the user equipment device.

4. The method of claim 2, wherein the supplemental content is a video media asset; and the method further comprises: simultaneously displaying the primary content in a primary window and the supplemental content on a secondary window as an overlay over the primary window.

5. The method of claim 2, further comprising: in response to receiving data indicative of the selection of the user selectable link, presenting a plurality of user selectable options for consuming the supplemental content.

6. The method of claim 5, wherein presenting the plurality of user selectable options includes one or more of: presenting a first option to interrupt playback of the primary content to display the supplemental content;
   presenting a second option to simultaneously display the primary content and the supplemental content, wherein the supplemental content is displayed in a picture-in-picture mode;
   presenting a third option to transmit the supplemental content for display on a second user equipment device; and
   presenting a fourth option to view a purchase offer related to the identified object.

7. The method of claim 6, wherein consumption of the primary content is scheduled to be interrupted to display promotional content; and
   the method further comprising: determining which of the user selectable options was selected on the first equipment device; and
   adjusting a frequency of the scheduled promotional content during consumption of the primary content based on selection of the user selectable options.

8. The method of claim 6, wherein consumption of the primary content is scheduled to be interrupted to display promotional content; and the method further comprising:
  determining which of the user selectable options was selected on the first equipment device; and
  adjusting a frequency of the scheduled promotional content during consumption of the primary content based on a duration of interaction with the supplemental content.

9. The method of claim 2, wherein the supplemental content to be displayed on the user equipment device is determined based on a content consumption profile associated with a first user consuming the primary content.

10. A system comprising: a storage database storing supplemental content associated with a plurality of objects; and control circuitry configured to:
  receive a segment of primary content to be displayed on a user equipment device for consumption;
  analyze the received segment to identify an object within the received segment of the primary content;
  determine whether supplemental content associated with the identified object is available;
  in response to determining that supplemental content associated with the identified object is available:
    determine whether the received segment of the primary content includes an audio component; and
    modify, in response to determining that the received segment of the primary content does not include an audio component, the received segment of the primary content to highlight the identified object;
  displaying the modified segment of the primary content on the user equipment device for consumption.

11. The system of claim 10, wherein the control circuitry, when modifying the received segment of the primary content, provides a user selectable link; and the control circuitry is further configured to: receive data indicative of a selection of the user selectable link; and
  in response to receiving data indicative of the selection of the user selectable link, display the supplemental content associated with the identified object on the user equipment device for consumption.

12. The system of claim 11, wherein the control circuitry is further configured to: in response to receiving data indicative of the selection of the user selectable link: prevent an audio component associated with the primary content from being output; and
  simultaneously display closed-captioning data associated with the primary content and the supplemental content on the user equipment device.

13. The system of claim 11, wherein the supplemental content is a video media asset; and
  the control circuitry is further configured to: simultaneously display the primary content in a primary window and the supplemental content on a secondary window as an overlay over the primary window.

14. The method of claim 11, wherein the control circuitry is further configured to: in response to receiving data indicative of the selection of the user selectable link, present a plurality of user selectable options for consuming the supplemental content.

15. The system of claim 14, wherein the control circuitry, when presenting the plurality of user selectable options, is configured to present one or more of: a first option to interrupt playback of the primary content to display the supplemental content;
  a second option to simultaneously display the primary content and the supplemental content, wherein the supplemental content is displayed in a picture-in-picture mode;
  a third option to transmit the supplemental content for display on a second user equipment device; and
  a fourth option to view a purchase offer related to the identified object.

16. The system of claim 15, wherein consumption of the primary content is scheduled to be interrupted to display promotional content; and
  the control circuitry is further configured to: determine which of the user selectable options was selected on the first equipment device; and adjust a frequency of the scheduled promotional content during consumption of the primary content based on selection of the user selectable options.

17. The system of claim 15, wherein consumption of the primary content is scheduled to be interrupted to display promotional content; and
  the control circuitry is further configured to: determine which of the user selectable options was selected on the first equipment device; and adjust a frequency of the scheduled promotional content during consumption of the primary content based on a duration of interaction with the supplemental content.

18. The system of claim 11, wherein the supplemental content to be displayed on the user equipment device is determined based on a content consumption profile associated with a first user consuming the primary content.

* * * * *